United States Patent
D'Costa et al.

(10) Patent No.: US 9,621,680 B2
(45) Date of Patent: Apr. 11, 2017

(54) CONSISTENT DATA MASKING

(71) Applicant: GLOBALFOUNDRIES Inc., Grand Cayman (KY)

(72) Inventors: Noel H. E. D'Costa, Bangalore (IN); Peter Hagelund, Copenhagen (DK); David J. Henderson, Newtown, PA (US); Robert J. Oakley, New Hope, PA (US); Ritesh Tandon, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 35 days.

(21) Appl. No.: 14/058,556

(22) Filed: Oct. 21, 2013

(65) Prior Publication Data

US 2015/0113656 A1    Apr. 23, 2015

(51) Int. Cl.
| | |
|---|---|
| *H04L 29/06* | (2006.01) |
| *G06F 21/60* | (2013.01) |
| *G06F 17/30* | (2006.01) |
| *G06F 21/62* | (2013.01) |

(52) U.S. Cl.
CPC ............ *H04L 67/42* (2013.01); *G06F 17/30* (2013.01); *G06F 17/30424* (2013.01); *G06F 17/30557* (2013.01); *G06F 21/60* (2013.01); *G06F 21/6254* (2013.01)

(58) Field of Classification Search
CPC combination set(s) only.
See application file for complete search history.

(56) References Cited

U.S. PATENT DOCUMENTS

| | | |
|---|---|---|
| 6,859,841 B2 | 2/2005 | Narad et al. |
| 7,917,770 B2 | 3/2011 | Gopinath et al. |
| 7,974,942 B2 | 7/2011 | Pomroy et al. |
| 8,055,668 B2 | 11/2011 | Pomroy et al. |
| 2006/0074897 A1 | 4/2006 | Fergusson |
| 2007/0016637 A1 | 1/2007 | Brawn et al. |
| 2009/0100527 A1* | 4/2009 | Booth et al. ..................... 726/27 |
| 2009/0204631 A1* | 8/2009 | Pomroy .............. G06F 21/6227 |
| 2011/0321120 A1* | 12/2011 | Saxena et al. .................... 726/1 |
| 2012/0096567 A1* | 4/2012 | Ferris .............................. 726/27 |

(Continued)

FOREIGN PATENT DOCUMENTS

WO    2009077705    6/2009

*Primary Examiner* — Jeffrey Pwu
*Assistant Examiner* — William Corum, Jr.
(74) *Attorney, Agent, or Firm* — DeLio, Peterson & Curcio, LLC; Kelly M. Nowak (57) ABSTRACT

According to one embodiment of the present invention, a system masks data objects across a plurality of different data resources. The system comprises a processor configured to include a plurality of service providers to mask the data objects, wherein each service provider corresponds to a different type of data masking for the data objects. An interface provides access to the plurality of service providers from different data-consumers to mask the data objects according to the corresponding types of data masking, wherein resulting masked data maintains relational integrity across the different data resources. Embodiments of the present invention further include a method and computer program product for masking data objects across a plurality of different data resources in substantially the same manners described above.

20 Claims, 4 Drawing Sheets

(56) References Cited

U.S. PATENT DOCUMENTS

2014/0123303 A1* 5/2014 Shukla et al. .................. 726/26
2014/0172806 A1* 6/2014 Wilding ............ G06F 17/30386
          707/693
2015/0067886 A1* 3/2015 Maman ............... G06F 21/6227
          726/27

* cited by examiner

```
' { PRO | PROVIDER } = CCN ,
  FLDDEFn = ( NAME = field-name ,
              { DT | DATATYPE } = datatype-value ,
              [ { PRE | PRECISION } = field-precision-value ] ,
              [ { SCA | SCALE } = field-scale-value ] ,
                  [ { LEN | LENGTH } = field-length-value ] ,
                  [ { CP | CODEPAGE } = codepage-value ] ,
              [ { CPT | CPTYPE } = { DB2ZOS | DB2LUW | ORACLE |
     SYBASE | ODBC | INFORMIX |
     NETEZZA | SQLSERVER | TERADATA |
     ANY | NONE } ]
                        ) ] ,
  [ { MTD | METHOD } = { REPEATABLE | RANDOM } ] ,
  [ { PAT | PATTERN } = pattern-value ] ,
           [ { WHENINVALID | WHENINV } = { PRESERVE | PRE } ] ,
  [ { DLIM | DISCARDLIMIT } = discard-limit-value ] ,
  [ { CP | CODEPAGE } = codepage-value ] ,
  [ { CPT | CPTYPE } = { DB2ZOS | DB2LUW | ORACLE |
  SYBASE | ODBC | INFORMIX |
  NETEZZA | SQLSERVER | TERADATA |
  ANY | NONE } ]
'
```

FIG.4

CONSISTENT DATA MASKING

BACKGROUND

1. Technical Field

Present invention embodiments relate to masking data, and more specifically, to masking data objects consistently across a plurality of different data resources to protect privacy.

2. Discussion of the Related Art

Data privacy is a concern for enterprises around the world. Collection, disclosure, and protection of consumers' nonpublic personal information or personally identifiable information (e.g., medical history, financial information, etc.) are governed by a range of laws and regulations (e.g., the Gramm-Leach Bliley Act; the Health Insurance Portability and Accountability Act; the European Union Data Protection Directive; privacy laws in Canada, Japan, and Australia; the Payment Card industry Data Security Standard; the Interagency Guidelines for Safeguarding Customer Information; Basel II operational controls and Sarbanes-Oxley internal controls; etc.).

To address these concerns, data masking capabilities are embedded in most commercially available Extract, Transform, and Load (ETL) and Test Data Management (TDM) products. Some database products and application software (e.g., enterprise resource planning (ERP) applications, customer relationship management (CRM) applications, human capital management (HCM) applications, etc.) also include data masking capabilities. In addition, point solutions have been developed to fill particular needs. Many companies build their own data masking solution to fit their situation if they can find no other appropriate tool.

Many large enterprises employ dozens of mission critical software applications, of which some are commercial, off the shelf applications while others are customer-created. These applications may share account information about the company's clients, products, and services, which may be subject to masking. The applications may interact with each other. In addition, an end-user may view the data using more than one of the applications. When the applications are used with a varied set of operating systems and data sources, an enterprise may have to piece together a data masking strategy from various niche and/or custom solutions. These disparate solutions will use different algorithms, resulting in inconsistently masked data.

BRIEF SUMMARY

According to one embodiment of the present invention, a system masks data objects across a plurality of different data resources. The system comprises a processor configured to include a plurality of service providers to mask the data objects, wherein each service provider corresponds to a different type of data masking for the data objects. An interface provides access to the plurality of service providers from different data-consumers to mask the data objects according to the corresponding types of data masking, wherein resulting masked data maintains relational integrity across the different data resources. Embodiments of the present invention further include a method and computer program product for masking data objects across a plurality of different data resources in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to masking data objects (e.g., replacing persons' names with fictional names, obscuring all or part of credit card numbers, etc.) consistently across a plurality of data resources to protect privacy. In an example scenario, a large organization may support computing platforms with a variety of operating systems (e.g., AIX, z/OS, Linux, etc.) and data sources (e.g., relational databases based on different relational database management systems (RDBMSs), flat files, spreadsheets, Extensible Markup Language (XML) files, comma separated values (CSV) files, etc.). An embodiment of the present invention allows the organization to mask the data in a manner that preserves relational integrity between data objects in different data sources. For example, persons' names may appear in both a relational database and a CSV file, and the organization may conduct research or test new software using the data masked in such a way that each name is always replaced with the same corresponding fictional name, whether in the database or the CSV file. Different applications, which may be interact with each other in an integrated manner, may use the masking services provided by a present invention embodiment and produce consistent results.

One aspect of a present invention embodiment is to provide a common set of masking services via a flexible, common interface. A set of masking service providers (also referred to as providers) encapsulate data masking algorithms for particular types of data objects (e.g., national identity number (NID) (e.g., Social Security Number (SSN), Canadian Social Insurance Number (SIN), etc.), credit card number (CCN), names, addresses, etc.) within a uniform application programming interface (API), so that different providers may be used with minimal changes to the software calling the API. The API may be used by applications written in a variety of programming languages (e.g., C, C++, Cobol, etc.). For example, masking may be incorporated via the API into Extract, Transform, and Load (ETL) tools, Hadoop platforms, etc. A masking grammar provides a high-level syntax that enables access to the masking service providers from high level programming and scripting languages (e.g., Pelt Lua, etc.), user-defined functions within a database, dynamic masking clients, etc. Regardless of the manner in which the data masking capabilities provided by a present invention embodiment are used, the same data may be masked identically and consistently.

Another aspect of a present invention embodiment is to facilitate user additions to the set of masking service providers. A service provider interface (SPI) allows users to implement their own masking service providers and plug them into the common framework so they may be used in the same manner as other masking service providers.

A further aspect of a present invention embodiment is to perform masking within a database server system. A set of user-defined functions (UDFs) and user-defined table functions (UDTFs) are installed and invoked within a database. These functions use the masking grammar to enable use of the masking service providers inside Structured Query Language (SQL) queries. This allows masking to be performed within the database and may be invoked via a database stored procedure to control unit of work commits and rollbacks. For example, a user may make a full copy of a database, and then execute a user defined function using a SQL statement including a user-defined function (UDF) to perform masking in-place on the copy. Alternatively, a user may apply masking using the UDF while creating or copying a table in the database using a SQL statement. Since, the UDF is an object in the database, the masking is performed within the database and may consume less time than if the data were extracted from the database, processed by a masking operation, and re-inserted into the database.

A still further aspect of a present invention embodiment is to provide dynamic masking (also referred to as "on the fly" masking). For example, a query may be made against a non-masked data source using a client application, and sensitive data in the result set may be masked dynamically based on the security profile of the end-user making the request.

Yet another aspect of a present invention embodiment is to provide a masking-on-demand application, including a command line interface, that provides convenient masking of common, non-relational file formats (e.g., CSV, XML, etc.) stored within various file systems (e.g., POSIX, Windows, Hadoop, etc.) and relational data sources. A wizard-driven front end places the power of the data masking service providers at the fingertips of the user without the complexity of implementing masking in a formal system (e.g., a test data management system, ETL system, etc.).

Figure 1:
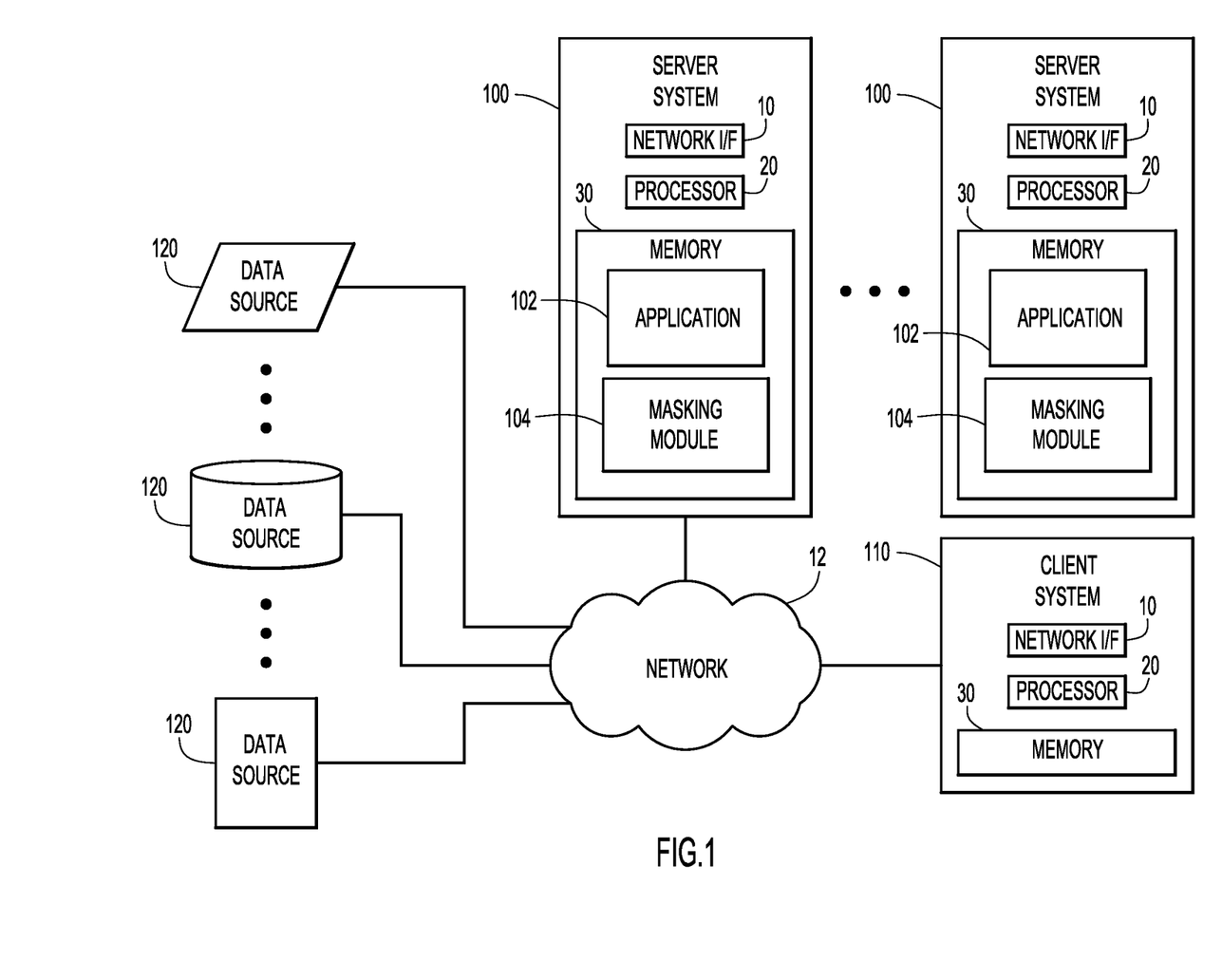
FIG. 1 depicts an example computing environment for an embodiment of the present invention.

An example environment for present invention embodiments is illustrated in FIG. 1. Specifically, the environment includes one or more server systems 100, one or more client or end-user systems 110, and one or more data sources 120. Server systems 100 and client systems 110 may be remote from each other and communicate over a network 12.

Network 12 may be implemented by any number of any suitable communications media (e.g., wide area network (WAN), local area network (LAN), Internet, intranet, etc). Alternatively, any number of server systems 100, client systems 110, and data sources 120 may be local to each other, and communicate via any appropriate local communication medium (e.g., local area network (LAN), hardwire, wireless link, intranet, etc.).

A server system 100 may include one or more applications 102 and masking module 104. Application 102 uses masking module 104 to mask information from data sources 120. Applications 102 may include user-created applications and/or other applications or utilities (e.g., a test data management suite, masking-on-demand application, user-defined functions, etc.) that use masking module 104 via API 202 (FIG. 2) to mask data from one or more data sources 120. The application and masking module may be implemented across plural server systems. Alternatively, the application and/or masking module may reside on a client system 110 or other computer system in communication with the data sources.

Client systems 110 enable users to communicate with the application, masking module, and/or data sources (e.g., via network 12). The client systems may present any graphical user (e.g., GUI, etc.) or other interface (e.g., command line prompts, menu screens, etc.) to receive commands from users and interact with the application, masking module, data sources and/or other modules or services.

Data sources 120 (e.g., include relational databases, flat files, spreadsheets, comma separated value (CSV) files, etc.) contain information accessed by application 102 including information that may be subject to masking.

Server systems 100 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., masking module software).

The masking module may include one or more modules or units to perform the various functions of present invention embodiments described below (e.g., managing resources, hashing, masking data, etc.), may be implemented by any combination of any quantity of software and/or hardware modules or units, and may reside within memory 30 of a server system and/or client systems for execution by processor 20.

Figure 2:
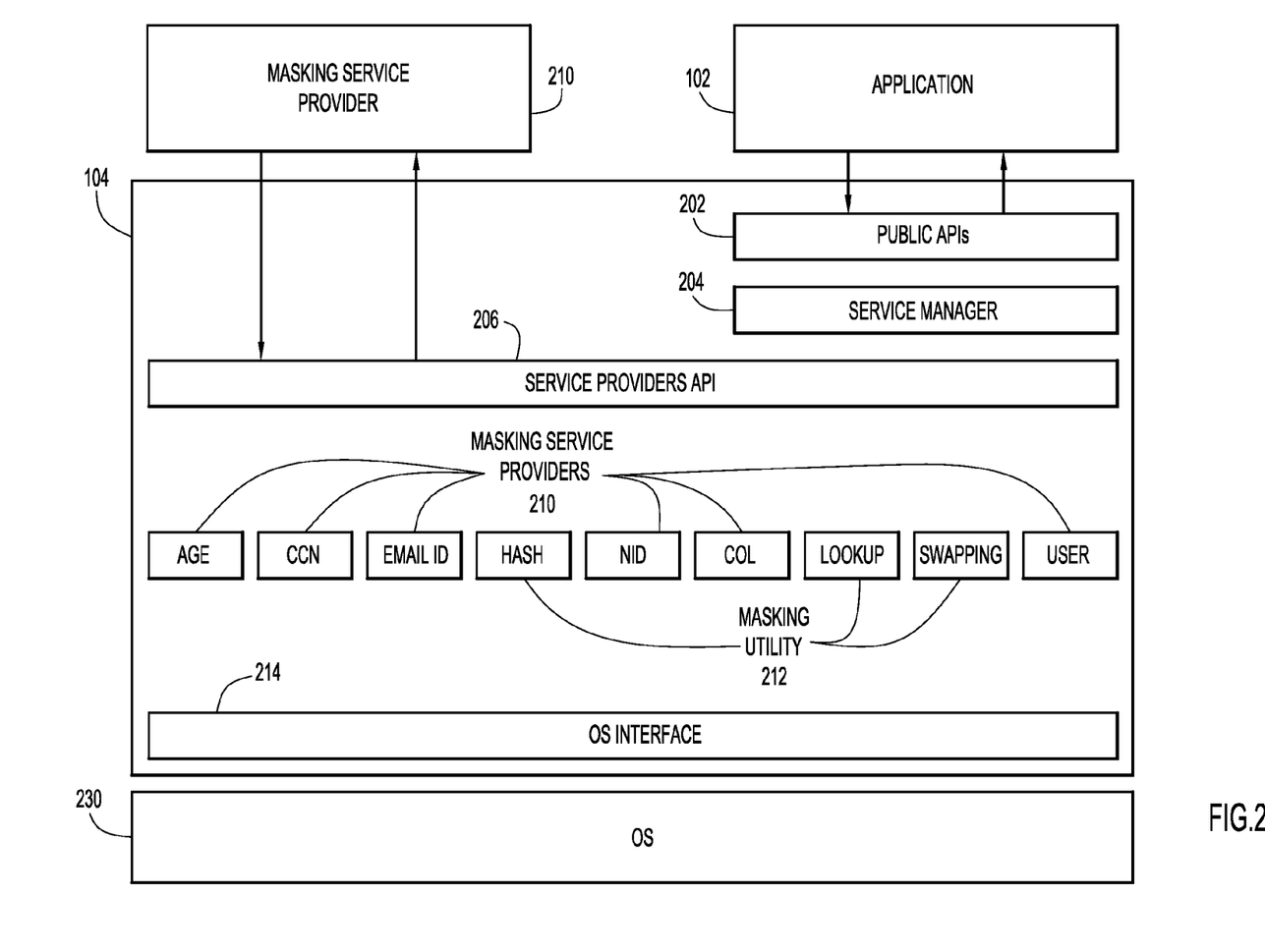
FIG. 2 depicts a block diagram of a masking module according to an embodiment of the present invention.

A block diagram of masking module 104 according to an embodiment of the present invention is illustrated in FIG. 2. The masking module includes public application programming interface (API) 202, service manager 204, service provider API 206, service providers 210, utilities 212, and operating system (OS) interface 214. The masking module may be implemented in a module framework with layers of functionality in separate libraries loosely coupled by the APIs.

Public API 202 is used by application 102 to communicate with the masking module (e.g., to apply masking to data from data source 120). For example, public API 202 may provide a C API comprising externalized functions callable from application 102, in addition, the public API may be used (e.g., via wrappers, mixed-language linking, etc.) by applications built using a variety of other programming languages (e.g., COBOL, C++, etc.). Public API 202 supports a masking provider grammar that allows high level languages and scripting languages (e.g., Lua, Perl, etc.) to gain access to services provided by the masking module.

The public API (and the back-end, in general) is independent of the data source. This provides the flexibility to support structured and unstructured data sources without limitation. The calling application is responsible for extracting data from a data source and passing the data to the masking module via the public API. The input and output data structures represent data as rows and columns/fields within the rows. Standard data types are used to represent various types of data (e.g. integer, char, null terminated strings, date, time, etc.)

Service manager 204 manages global resources for masking module 104 and data being transported from public API 202 to individual masking service providers 210. Service providers interface (SPI) 206 is a C interface point to and from each masking service provider 210. Masking service providers 210 may include pre-defined masking service providers (for masking, e.g., a person's ages, credit card number (CCN), e-mail address) national identity, city, country, etc.) and user-written masking service providers. User-written service providers may be added into masking module 104 or may reside external to the masking module. In addition, masking module 104 may include utility functions 212 (e.g., hashing functions, table lookup functions, swapping functions, etc.) that are exposed via service provider API 206 for use by pre-defined and/or user-written masking service providers. The masking service providers are data source agnostic and support virtually all data types and character sets (e.g., ASCII, Unicode, Multi-byte, etc).

Operating system (OS) interface 214 handles operating system-specific functions (e.g., input/output, logging, exception handling, etc.) for the masking module for each of the supported environments (e.g., AIX, Linux, Windows, Solaris, Hewlet-Packard UniX (HP UX), z/OS, etc.). In addition, OS interface 214 may handle operating system-specific functions for applications (e.g., in an embodiment-provided masking on demand application).

Figure 3:
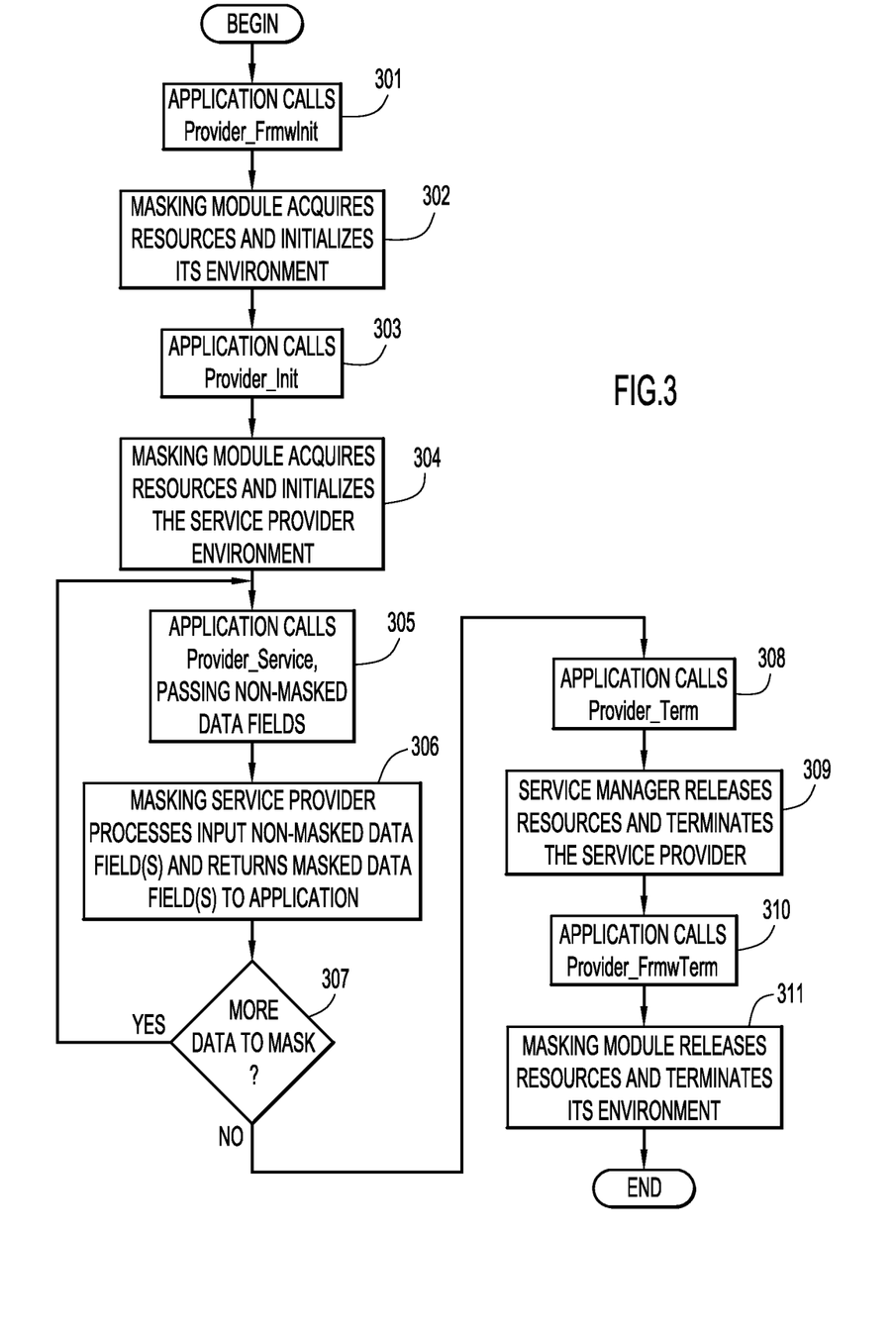
FIG. 3 depicts a flow diagram illustrating an example manner of masking information using a public interface according to an embodiment of the present invention.

A manner of interacting with masking module 104 from application 102 according to an embodiment of the present invention is illustrated in FIG. 3. In particular, application 102 makes an initial call to the masking module via a Provider_FrmwInit function of public API 202 at step 301.

At step 302, the masking module receives control (e.g., of program execution on processor 20), loads other libraries (e.g., operating system specific libraries), acquires resources (e.g., memory for data to be masked, log file handles, etc.), and initializes itself to provide data masking services for any of the available masking service providers 210.

At step 303, the application prepares a data structure for communicating information to the masking module. This structure identifies the specific masking service provider needed by the application and control parameters to drive execution of the masking service provider. The application then calls the masking module via a Provider_Init function of public API 202 to initialize (e.g., load dictionaries, set processing options, etc.) the specified masking service provider.

At step 304, the masking module receives control, interprets the input structure, acquires resources, loads a library containing the specified masking service provider, and initializes the service provider for data masking. The masking module returns a token identifier to the application. This token identifier is passed by the application to the masking module in subsequent service calls to identify the specified and initialized masking service provider or masking service provider instance from any other masking service providers that may be operating in the same process.

At step 305, the application prepares the input structure with one or more input buffers for the data to be masked and with the token identifier returned from the Provider_Init function call. The masking module may process masking tasks as single entities or in user-defined batch sizes. The application then calls a Provider_Service function of public API 202 to mask the data identified in the one or more input buffers.

At step 306, the masking module receives control, interprets the token identifier, interprets the input buffer(s), masks the data, and returns the masked data to the application. The masked data is returned either in the input buffer(s), or optionally, in corresponding output buffer(s).

At step 307, the application determines whether more data remains to be masked. If so, processing returns to step 305. Otherwise, at step 308, the application calls a Provider_Term function of the public API (passing the token identifier in the call) to terminate use of the specified masking service provider by that application.

At step 309, the masking module receives control, interprets the token identifier, releases resources, and terminates the masking service provider specified by the token identifier for the application.

At step 310, the application calls the masking module via a Provider_FrmwTerm function of the public API to allow the masking module framework to be terminated.

At step 311, the masking module receives control, releases resources, and terminates the masking module framework environment.

Figure 4:
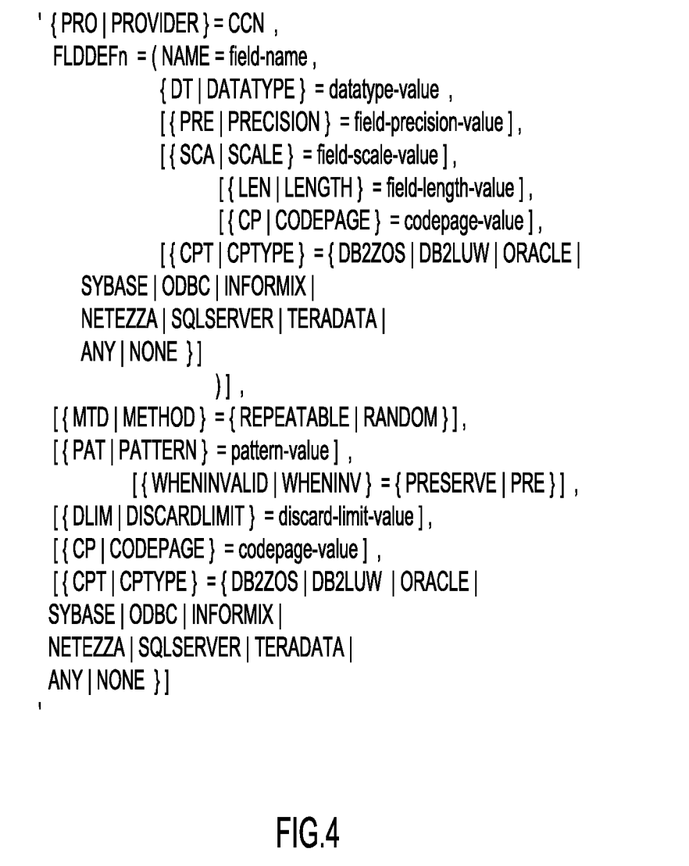
FIG. 4 an example form of an input parameter string for a service provider for credit card numbers according to an embodiment of the present invention.

An example using the masking service provider for credit card numbers (CCNs) illustrates the masking grammar. Example keywords and parameters (some common to all masking service providers, some specific to the CCN provider) are described, followed by examples of the use of the CCN provider in a UDF and within a Lua script. An input parameter string contains control information using the masking grammar. An example form of the input parameter string for a CCN service provider according to an embodiment of the present invention is illustrated in FIG. 4. A required parameter named PRO (or PROVIDER) specifies the masking service provider. For example, the term PRO=CCN specifies that the provider for credit card numbers is requested.

A required parameter FLDDEFn describes the attributes of a field. The n suffix correlates to the index of the field, argument or field-name specified in the query or expression. For example, FLDDEF1 describes the attributes of the first field. FLDDEF2 describes the attributes of the second field, etc. The FLDDEF parameter includes sub-parameters enclosed within parenthesis to separate them from other parameters.

In particular, a required FLDDEF sub-parameter NAME specifies the field name. For example: FLDDEF1= (NAME=FIELD1) indicates that field number 1 is named "FIELD1,"

A required FLDDEF sub-parameter named DT (or DATATYPE) specifies the data type of the field. Example values, and their characteristics, that may be assigned to the DT sub-parameter include the following:

i) CHAR

Fixed size character data which is left justified and space padded.

ii) DATE

The date is contained within three consecutive shorts integers. The first is a signed short that contains the year, the second is an unsigned short that contains the month and the third is an unsigned short that contains the day. In a C-type structure format the date appears as:

```
typedef struct s_odbc_date
{
signed short Year;
unsigned short Month;
unsigned short Day;
} ODPP_ODBC_DATE;
``` iii) DATETIME_CHAR

This a fixed size character data containing a date-time value that is left justified and space padded.

iv) DATETIME_SZ

This is a character data string containing a date-time value that is left justified, space padded and terminated by a NULL character.

v) DATETIME_VARCHAR

This is a variable size character data starting with a short integer value which indicates the length, in bytes, of the character date-time value that follows.

vi) DATETIME_WCHAR

This is a fixed size wide-character data containing a date-time value that is left justified and space padded.

vii) DATETIME_WSZ

This is a wide character data string containing a date-time value that is left justified, space padded and terminated by a NULL character.

viii) DATETIME_WVARCHAR

This is a variable size wide character data starting with a short integer value which indicates the length, in bytes, of the wide character date-time value that follows.

ix) DECIMAL_370

This is an IBM mainframe 370/MVS/ESA/zOS packed decimal encoded buffer. A packed decimal field has two decimal numbers expressed in a single byte of storage in all but the rightmost/last portion of a packed decimal field. The last rightmost/last byte has the sign indicator in the rightmost/last part of the byte. The standard signs used a 0xF for positive numbers and 0xD for negative numbers.

x) DOUBLE

This is a double precision floating point number. Range of values: 1.7E+/−308 (15 digits).

xi) FLOAT

This is a floating point number. Range of values: 3.4E+/−38 (7 digits).

xii) INTEGER

This is a 4-byte signed integer. Range of values: −2,147,483,648 to 2,147,483,647.

xiii) LONG_LONG

This is an 8-byte signed numeric value. Range of values: −9,223,372,036,854,775,808 to 9,223,372,036,854,775,807.

xiv) ORA_VARNUM

This is an Oracle VARNUM-type. It is similar to the Oracle external datatype NUMBER except that the first byte contains the length of the number representation. The length value does not include the length byte itself. The user must reserve 22-bytes to use the longest possible VARNUM where the 1st byte is the length and bytes 2-through 22 contain the 21-binary format of the Oracle NUMBER-type.

xv) SMALLINT

This is a 2 byte signed integer value. Range of values: −32,768 to 32,767 xvi) TIME

The time is contained in three consecutive unsigned shorts. The first contains the hour, the second contains the minute and the third contains the second. In a C-type structure format the time appears as:

```
typedef struct s_odbc_time
{
unsigned short Hour;
unsigned short Minute;
unsigned short Second;
} ODPP_ODBC_TIME;
``` xvii) TIMESTAMP

The timestamp is contained in a consecutive arrangement of six shorts followed by an unsigned integer. The first is a signed short that contains the year, the second is an unsigned short that contains the month, the third is an unsigned short that contains the day, the fourth is an unsigned short that contains the hour, the fifth is an unsigned short that contains the minute the sixth is an unsigned short that contains the second and at the end of this consecutive arrangement is an unsigned integer that contains the fractional second. In a C-type structure format the timestamp appears as:

```
typedef struct s_odbc_timestamp
{
signed short Year;
unsigned short Month;
unsigned short Day;
unsigned short Hour;
unsigned short Minute;
unsigned short Second;
unsigned int Fraction;
} ODPP_ODBC_TIMESTAMP;
``` xviii) U_INTEGER

This is a 4 byte unsigned integer value. Range of values: 0 to 4,294,967,295.

xix) U_LONG_LONG

This is an 8-byte unsigned numeric value. Range of values: 0 to 18,446,744,073,709,551,615.

xx) U_SMALLINT

This is a 2-byte unsigned integer value. Range of values: 0 to 65,535 xxi) U_TINYINT

This is a single byte unsigned integer value. Range of values: 0 to 255 xxii) VARCHAR

This indicates character data starting with a short integer value which indicates the length, in bytes, of the character data to follow.

xxiii) VARCHAR_SZ

This indicates character data string which is terminated by a NULL character.

xxiv) WCHAR

This is a fixed size wide Character data which is left justified and space padded.

xxv) WVARCRAR.

This is wide character data starting with a short integer value which indicates the length, in bytes, of the wide character data to follow.

xxvi) WVARCHAR_SZ

This is wide character data string which is terminated by a NULL character.

For example, the expression FLDDEF1=(NAME=FIELD1, DT=WCHAR) specifies that field number 1 is named "FIELD1" and has a data type of WCHAR.

In some cases, e.g., for some UDFs, some information is not needed because it can be determined within the UDF.

An optional FLDDEF sub-parameter named LEN for LENGTH) specifies the length of a character field as an integer value. This parameter is required only when this information is not available within the environment in which the masking module is executing, and is used only with character data types (e.g., CHAR, VARCHAR, VARCHAR_SZ, WCHAR, WVARCHAR, WVARCHAR_SZ, DATETIME_CHAR, DATETIME_SZ, DATETIME_VARCHAR, DATETIME_WCHAR, DATETIME_WSZ, DATETIME_WVARCHAR). For example, the expression FLDDEF1=(LEN=10, NAME=FIELD1, DT=WVARCHAR) specifies that field number 1 has data type WVARCHAR and is ten characters long.

An optional FLDDEF sub-parameter named PRE (or PRECISION) specifies the precision of a numeric field. This parameter is required only when this information is not available within the masking module executing environment. The value of this field is an integer that specifies the precision of field. For example, the expression FLDDEF1=(PRE=5, NAME=FIELD2, DT=DOUBLE) indicates that field number 2 has a precision of five digits.

An optional FLDDEF sub-parameter named SCA (or SCALE) specifies the scale of a numeric field. This parameter is required only when this information is not available within the masking module executing environment. Its value is a short integer that specifies the scale of the field. For example, the expression FLDDEF1=(PRE=5, SCA=2, NAME=FIELD2, DT=DOUBLE) indicates that field number 2 has a precision of five and a scale of two.

An optional FLDDEF sub-parameter named CP (or CODEPAGE) specifies the code page of the data. This parameter is required only when; the type of data is CHAR, VARCHAR, VARCHAR_SZ, DATETIME_CHAR, DATETIME_SZ, or DATETIME_VARCHAR: and this information is not available within the masking module executing environment, the CP/CODEPAGE parameter was not specified outside of the FLDDEF, or the code page of the data for the subject FLDDEF is different than the CP/CODEPAGE specified outside of the FLDDEF. This parameter takes an integer value that specifies the codepage or character-set identifier. For example, FLDDEF1=(CP=1252, NAME=FIELD3, DT=CHAR) specifies code page 1252.

An optional FLDDEF sub-parameter named CPT or CPTYPE specifies the code page type. This parameter is required only when: the type of data is CHAR, VARCHAR, VARCHAR_SZ, DATETIME_CHAR, DATETIME_SZ, or DATETIME_VARCHAR; the CP/CODEPAGE sub-parameter is specified; and this information is not available within the ODPP executing environment, the CPT/CPTYPE parameter was not specified outside of the FLDDEF, or the source of the data for the subject FLDDEF is different than the CPT/CPTYPE specified outside of the FLDDEF.

The following Table 1 identifies the code page type abbreviations based upon the data source:

TABLE 1

Code page type abbreviations

| Type Values | Data Source |
|---|---|
| DBZ or DB2zOS | DB2 z/OS |
| DB2 or DB2LUW | DB2-LUW |
| ORA or ORACLE | Oracle |
| SYB or SYBASE | Sybase |
| ODBC | ODBC |
| IFX or INFORMIX | Informix |
| MSS or SQLSERVER | MS SQL Server |
| TD or TERADATA | Teradata |
| NZ or NETEZZA | Netezza |
| ANY | any DBMS |
| NONE | no DBMS |

In many cases, the source of the input data is a DBMS in which case a DBMS-type code page type value is required. This ensures that the masking module handles the data using DBMS-specific code pages. When the origin of the data is DBMS specific but not tied to any one DBMS, then the value should be specified as ANY. When the origin of the data is from a non-DBMS source, then the value should be specified as NONE.

An example expression using CP and CPT is the following: FLDDEF1=(CP=943, CPT=DB2, NAME=FIELD=4, DT=VARCHAR). This expression specifies that the code page for the field is DB2.

Parameters that are specified within the input parameter string and that are used for more than one of the masking service provider specific grammar include CP (or CODEPAGE), CPT (or CPTYPE), and DLIM (or DISCARDLIMIT).

CP specifies the code page of the data for all data-related input. This parameter may be optionally overridden within a FLDDEFn-typo parameter when there is a difference in the code pages between fields within the same syntax expression. This allows the masking module to handle data expressed in different code pages between different fields. The default is UTF-8 (Unicode). The parameter takes an integer value that specifies the codepage or character-set identifier.

CPT is an optional parameter that specifies the code page value. This code page type applies to all data-related input. This parameter may be optionally overridden within a FLDDEFn-type parameter when there is a difference in the code page types between fields within the same syntax expression. This allows the masking module to handle data expressed in different DBMS-specific code pages.

The DLIM parameter specifies the number of failed rows that should be discarded or ignored before a process takes an action. The particular action depends on the specific implementation (e.g. Lua, UDF, etc). For example, the expression DLIM=10 specifies that ten rows are to be discarded.

The input to an masking module-based UDF is specified with the following format:

```
OptimMask<ret-type> ( argument-1 , ... argument-n , 'ODPP-
   provider-input-syntax ' ).
```

The term OptimMask<ret-type> is the name of the ODPP-type UDFs. <ret-type> is the return data type from the UDF which is based upon the categorization of data types that are supported within each DBMS. The terms argument-1, . . . argument-n are the input arguments to the UDF. At least one argument is required as the object of the UDF. This argument may be any type of SQL expression supported by the hosting DBMS. In many cases, this will simply be the name of the source column. The string 'ODPP-provider-input-syntax' is the syntax expression that is input to the ODPP-specific service provider, for example:

```
SELECTCCNCol, OptimMaskStr800Latin(CCNCol,
    'pro=ccn,mtd=repeatable, flddef1=(name=CCNvc,dt=char)')
   MaskedCCN from TestTable.
```

In the above example, OptimMaskStr800Latin is the name of the masking module-based UDF, which can return VARCHAR string of max. 800 characters; CCNCol is the table column-name to be masked; 'pro=ccn,mtd=repeatable, flddef1=(name=CCNvc,dt=char)' is the ODPP syntax that is requesting the masking module CCN service provider. The method of masking is repeatable.

Scripts (e.g., Lua scripts) may be used for customized column processing with a database. These scripts may invoke masking module 104 to mask data values. A call to a masking service provider from a Lua script uses the same masking grammar as described above in the context of a UDF. For example, the following Lila code may be used to generate a masked value via the masking service provider for credit card numbers (CCN).

```
VALUE = source.field.getvalue("CreditCardNum")
   -- get CreditCardNum field value
MASK_VALUE = OptimMaskStr800Latin(VALUE,
   'pro=ccn,mtd=repeatable,
```

-continued

```
flddef1=(name=CCNvc,dt=char)')
target.field.setvalue(MASK_VALUE)
```

It will be appreciated that the embodiments described above and illustrated in the drawings represent only a few of the many ways of implementing embodiments for masking data objects consistently across a plurality of different data resources to protect privacy.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation. Application 102, masking module 104, and some or all components thereof may be coupled in any manner (e.g., statically linked, dynamically linked, inline, within the same process or separate processes, within the same or separate processors, etc.).

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for any type of data object masking.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having" "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for masking data objects across a plurality of different data resources comprising:
a masking module having a public application programming interface (API), a service manager, a service provider API, and a plurality of masking service providers;
an application making an initial call to the masking module via the public API for applying masking to data extracted from a data source, the public API supporting a masking provider grammar that allows various computer languages to gain access to services provided by the masking module; the masking module is initialized to provide data masking services to any of said plurality of service providers to mask the data objects residing on said masking module, wherein each service provider corresponds to a different type of data masking for the data objects, whereby the public API provides access to the plurality of service providers from different data-consumers to mask the data objects according to the corresponding types of data masking such that resulting masked data maintains relational integrity across the different data resources; and     a data structure prepared by said application that identifies a specific one of said plurality of masking service providers along with control parameters to drive execution of said specific one of said plurality of masking service providers;

a token identifier that has been passed from the masking module to the application identifying said specific one of said plurality of masking service providers;

one or more input buffers for the data to be masked along with said token identifier input from the application to the masking module;

at least one processor of the masking module configured to:

receive a request via the public API from a data-consumer to access to a selected one of the services providers;

receive data via the public API from the data-consumer for masking by the selected service provider, said data including said token identifier and said one or more input buffers;

interprete said token identifier and said one or more input buffers at the masking module to mask the received data using the selected service provider;

return the masked data to the data-consumer via the public API; and         determine whether additional data remains to be masked, and if so, masking said additional data.

2. The system of claim 1, wherein the data-consumers include at least one of user generated applications and user defined functions.

3. The system of claim 1, wherein the request received via the public API includes a data structure identifying the selected service provider and control parameters for the selected service provider.

4. The system of claim 1, wherein the at least one processor is further configured to add a new service provider performing a corresponding type of data masking to the plurality of service providers and provide access to the new service provider via the interface, wherein the new service provider comprises a new software module.

5. A computer program product for masking data objects across a plurality of different data resources comprising:

a computer readable storage medium having computer readable program code embodied therewith for execution on a processing system, the computer readable program code comprising computer readable program code configured to:

provide a masking module having a public application programming interface (API), a service manager, a service provider API, and a plurality of masking service providers;

provide an application making an initial call to the masking module via the public API for applying masking to data extracted from a data source, the public API supporting a masking provider grammar that allows various computer languages to gain access to services provided by the masking module;

the masking module is initialized to provide data masking services to any of said plurality of service providers to mask the data objects residing on said masking module, wherein each service provider corresponds to a different type of data masking for the data objects, whereby the public API provides provide access to the plurality of service providers from different data-consumers to mask the data objects according to the corresponding types of data masking, wherein resulting masked data maintains relational integrity across the different data resources; provide a data structure prepared by said application that identifies a specific one of said plurality of masking service providers along with control parameters to drive execution of said specific one of said plurality of masking service providers;

provide a token identifier that has been passed from the masking module to the application identifying said specific one of said plurality of masking service providers;

provide one or more input buffers for the data to be masked along with said token identifier input from the application to the masking module;

receive a request via the public API from a data-consumer to access to a selected one of the services providers;

receive data via the public API from the data-consumer for masking by the selected service provider, said data including said token identifier and said one or more input buffers;

interprete said token identifier and said one or more input buffers at the masking module to mask the received data using the selected service provider;

return the masked data to the data-consumer via the public API; and     determine whether additional data remains to be masked, and if so, masking said additional data.

6. The computer program product of claim 5, wherein the data-consumers include at least one of user generated applications and user defined functions.

7. The computer program product of claim 5, wherein the request received via the public API includes a data structure identifying the selected service provider and control parameters for the selected service provider.

8. The computer program product of claim 5, wherein the computer readable program code is further configured to add a new service provider performing a corresponding type of data masking to the plurality of service providers and provide access to the new service provider via the interface, wherein the new service provider comprises a new software module.

9. The system of claim 1, further including:

generating a token identifier at the masking module that identifies the specific one of said plurality of masking service providers;

transferring the token identifier from the masking module to the application;

in subsequent service calls, passing the token identifier from the application to the masking module to identify the specific one of said plurality of masking service providers and the initialized masking service provider instance from others of said plurality of masking service providers.

10. The system of claim 1, wherein the public API is independent from the data source to support structured and unstructured data sources.

11. The system of claim 1, wherein the masking module processes masking tasks as single task.

12. The system of claim 1, wherein the masking module processes masking tasks in user-defined batches.

13. The system of claim 1, further including a plurality of masking utilities of the masking module.

14. The system of claim 1, wherein the extracted data includes input and output data structures represented as rows and column fields within the rows.

15. The system of claim 14, wherein the extracted data further include standard data types selected from the group consisting of an integer, char, null terminated strings, date, and time.

16. The system of claim 1, wherein the plurality of masking service providers corresponds to a different type of data masking for the data objects.

17. The system of claim 16, wherein the interface provides access to the plurality of service providers from different data-consumers to mask the data objects according to the corresponding types of data masking, wherein resulting masked data maintains relational integrity between corresponding masked data objects across different data sources by replicating the masked data objects in all of the plurality of data sources.

18. The system of claim 17, further including at least one processor configured to:
    receive a request via the interface from a data-consumer to access to a selected one of the services providers;
    receive data via the interface from the data-consumer for masking by the selected service provider;
    mask the received data using the selected service provider; and
    return the masked to the data-consumer via the interface.

19. The system of claim 1, wherein the token identifier comprise sets of user-defined functions and user-defined table functions installed and invoked within a database, said functions using the masking grammar to enable use of the masking service providers.

20. The system of claim 19, wherein the user-defined functions and the user-defined table functions are invoked in data tables.

* * * * *